(12) United States Patent
Akiyama et al.

(10) Patent No.: US 7,173,090 B2
(45) Date of Patent: Feb. 6, 2007

(54) POLYPHENYLENE SULFIDE RESIN COMPOSITION

(75) Inventors: Yoshikuni Akiyama, Sodegaura (JP); Minoru Sakata, Sodegaura (JP); Kuniaki Minonishi, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/492,930

(22) PCT Filed: Oct. 25, 2001

(86) PCT No.: PCT/JP01/09399

§ 371 (c)(1),
(2), (4) Date: Apr. 19, 2004

(87) PCT Pub. No.: WO03/035760

PCT Pub. Date: May 1, 2003

(65) Prior Publication Data

US 2004/0266951 A1    Dec. 30, 2004

(51) Int. Cl.
*C08L 81/02*    (2006.01)

(52) U.S. Cl. .................. 525/88; 525/92 R; 525/92 D; 525/92 H; 525/98; 525/132; 525/208

(58) Field of Classification Search ............. 429/176; 525/88, 92 R, 92 D, 92 H, 98, 132, 208
See application file for complete search history.

(56) References Cited

U.S. PATENT DOCUMENTS 5,945,490 A * 8/1999 Tsuda et al. ............. 525/537
6,875,812 B1 * 4/2005 Akiyama et al. ........... 525/98

FOREIGN PATENT DOCUMENTS

| EP | 0 360 544 A2 | 9/1989 |
|---|---|---|
| JP | 56-34032 B2 | 8/1981 |
| JP | 58-27740 A | 2/1983 |
| JP | 58-40350 A | 3/1983 |
| JP | 58-154757 A | 9/1983 |
| JP | 59-207921 A | 11/1984 |
| JP | 62-153343 A | 7/1987 |
| JP | 62-153344 A | 7/1987 |
| JP | 62-153345 A | 7/1987 |
| JP | 62-169854 A | 7/1987 |
| JP | 62-172056 A | 7/1987 |
| JP | 62-172057 A | 7/1987 |
| JP | 1-213359 A | 8/1989 |
| JP | 1-213361 A | 8/1989 |
| JP | 1-266160 A | 10/1989 |
| JP | 2-75656 A | 3/1990 |
| JP | 2-86652 A | 3/1990 |
| JP | 3-20356 A | 1/1991 |
| JP | 3-153757 A | 7/1991 |
| JP | 3-244661 A | 10/1991 |
| JP | 5-339500 A | 12/1993 |
| JP | 9-161737 A | 6/1997 |
| JP | 10-53706 A | 2/1998 |
| JP | 10-302733 A | 11/1998 |
| JP | 2000-357499 A | 12/2000 |
| JP | 2001-302916 A | 10/2001 |
| WO | WO 97/36946 A1 | 10/1997 |

OTHER PUBLICATIONS

Junzo et al., electronic translation of JP 05-339500 (Dec. 1993).*
Akifumi et al., electronic translation of JP 09-161737 (Dec. 1995).*

* cited by examiner

*Primary Examiner*—Jeffrey Mullis
(74) *Attorney, Agent, or Firm*—Birch, Stewart, Kolasch & Birch, LLP

(57) ABSTRACT

A polyphenylene sulfide resin composition including a polyphenylene sulfide resin having a specific amount of oligomers and a specific amount of a functional group, an amorphous thermoplastic resin having a glass transition temperature (Tg) of 120° C. or higher, and an additive having a specific amount of a functional group. The moldings obtained from this polyphenylene sulfide resin composition have a good toughness (impact strength) and weld strength. The use of this polyphenylene sulfide resin composition as a material for secondary battery cases makes it possible to maintain the initial electrolytic performance over a long period of time.

15 Claims, No Drawings

POLYPHENYLENE SULFIDE RESIN COMPOSITION

TECHNICAL FIELD

The present invention relates to polyphenylene sulfide resin compositions, particularly relates to polyphenylene sulfide resin compositions for secondary battery cases and as sheet or film materials for secondary batteries.

BACKGROUND ART

Polyphenylene sulfide has been utilized in the electronic field because it has good flow properties due to its crystallinity and good heat resistance and water resistance. However, when polyphenylene sulfide is used as molding materials, it has a defect of poor toughness (impact strength), so it is difficult to utilize it for various moldings, particularly large moldings.

In order to eliminate the above defect, a number of attempts for blending or alloying polyphenylene sulfide with various resins, various thermoplastic elastomers or the like have been proposed.

For example, JP-B-56-34032 describes resin compositions excellent in moldability and flammability consisting of polyphenylene oxides and polyphenylene sulfides. JP-A-58-27740 by the present applicant describes a modified block copolymer composition excellent in impact and delamination resistance consisting of polyphenylene sulfide or other engineering resins and a hydrogenated block copolymer modified with α,β-unsaturated carboxylic acid derivatives. In JP-A-58-40350, the present applicant also proposes a thermoplastic graft copolymer excellent in impact resistance consisting of polyphenylene sulfide or other engineering plastics, a hydrogenated block copolymer modified with α,β-unsaturated carboxylic acid derivatives and epoxy group-containing polymers. JP-A-58-154757 describes a polyarylene sulfide resin composition excellent in impact resistance and moldability/processability consisting of polyarylene sulfide and a copolymer of α-olefin/α,β-unsaturated acid glycidyl ester. JP-A-59-207921 describes a resin composition excellent in impact resistance consisting of polyphenylene sulfide, polyolefin graft-copolymerized with an unsaturated carboxylic acid or its anhydride or their derivatives and an epoxy resin. JP-A-62-153343, JP-A-62-153344 and JP-A-62-153345 describe polyphenylene sulfide resin compositions excellent in impact resistance consisting of a specific polyphenylene sulfide and a copolymer of α-olefin/α,β-unsaturated acid glycidyl ester. JP-A-62-169854, JP-A-62-172056 and JP-A-62-172057 also describe polyphenylene sulfide resin compositions excellent in impact resistance consisting of a specific polyphenylene sulfide and polyolefin graft-copolymerized with an unsaturated carboxylic acid or its anhydride or their derivatives.

On the other hand, regarding resin compositions comprising polyphenylene sulfide and polyphenylene ether, the use of copolymers having specific functional groups as additives are proposed for the purpose of improving their compatibility. For example, JP-A-01-26616 and JP-A-02-75656 describe methods of using copolymers of styrene and ethylenically unsaturated monomers having an oxazolyl group for improving the compatibility of acid-modified polyphenylene ether and modified polyphenylene sulfide. JP-A-01-213359, JP-A-01-213361, JP-A-02-86652 and JP-A-05-339500 describe methods of using copolymers of styrene and ethylenically unsaturated monomers having a glycidyl group for improving the compatibility of polyphenylene ether and polyphenylene sulfide. JP-A-03-20356 describes a method of using copolymers of styrene and ethylenically unsaturated monomers having an oxazolyl group for improving the compatibility of polyphenylene sulfide and polyphenylene ether.

However, the materials design of the resin compositions disclosed in these prior art references is not adequate in terms of dispersibility of resin compositions consisting of polyphenylene sulfide and polyphenylene ether, and in toughness and weld strength of the resulting moldings.

Moreover, JP-A-09-161737 discloses that compositions using copolymers of styrene and ethylenically unsaturated monomers having an oxazolyl group for improving the compatibility of polyphenylene sulfide and polyphenylene ether can be utilized as a case for a sealed alkaline secondary battery. However, under the present situation, even the compositions disclosed therein are inadequate in terms of dispersibility of a dispersed phase, and in toughness and weld strength of the resultant moldings.

Incidentally, resin material applications have been currently expanding into applications for power sources for driving mobile equipment, power sources for computer data backup, solar batteries for the purpose of effective utilization of solar energy, and various secondary batteries in terms of environmental protection. It is well known that secondary batteries are frequently used for supplying required electric power to the internal combustion engines of automobiles. Moreover, the so-called electric vehicles which directly utilize secondary batteries as driving power sources in place of internal combustion engines are under energetic development. Thus, demand for secondary batteries tends to grow increasingly as industrial technologies develop, and requirements for further decrease in size and weight together with increase in electric capacity are increasing.

Battery cases (containers) for holding an electrolytic solution and electrodes, sheets for battery cases and films for battery cases are essential to secondary batteries. The main properties required for the resin materials for battery cases first include resistance to electrolytic solutions. For example, various resistances are required, such as, resistance to aqueous alkaline solution for alkaline storage batteries; resistance to organic electrolytic solution (for example, an organic electrolytic solution comprising a solute of lithium hexafluorophosphate ($LiPF_6$) and a solvent of propylene carbonate/1,2-dimethoxy ethane) for lithium ion batteries; resistance to oils for use in automobile applications; and resistance to acids for lead storage batteries.

In addition, secondary batteries are required to appropriately maintain the properties of electrolytic solutions for a long period of time. For example, for an alkaline storage battery, the battery performance may be deteriorated when water in an aqueous alkaline solution in a battery case is permeated to the outside of the battery cell. On the other hand, for a lithium ion battery, the battery performance may be deteriorated due to the decomposition of a lithium salt (for example, lithium hexafluorophosphate ($LiPF_6$) or lithium tetrafluoroborate) in an organic solution when water enters into a battery case from the outside. Further, the performance capable of enduring heat generation and increase of internal pressure associated with chemical change during charging and discharging is also required.

Furthermore, sealed secondary batteries are especially required to be compact and lightweight wherever possible, and to have large electric capacity with long battery life. Therefore, cases for sealed secondary batteries should have good toughness (impact strength, elongation) when they have thin wall thicknesses. Moreover, they are required to be excellent in heat resistance, thermal creep resistance, and thermal rigidity so that they can endure harsh conditions such as heat generation and increase in internal pressure during charging and discharging. And these requirements are the same also in the field of sheets for battery cases.

Polypropylene resins and ABS resins have been mainly adopted for these resin materials for secondary battery cases. However, polypropylene resins are excellent in flowability during molding, resistance to hot water permeability (resistance to water vapor permeability), and resistance to gas permeability, but they have defects such as large molding shrinkage percentage, poor rigidity, particularly poor rigidity at high temperatures and poor thermal creep resistance, in the injection molding of products having structures with thin wall thicknesses and ribs. On the other hand, ABS resins are inadequate in durability to gasoline and oils (for example, brake oil and preservatives) and have high hot water permeability and high gas permeability when applied to automobile applications, so they cannot maintain the properties of an electrolyte when used for a long time and cannot satisfy essential requirements of secondary batteries that the electric capacity shall be ensured over a long time. On the other hand, the polyphenylene sulfide resin compositions disclosed in the prior art references described above satisfy the above performance requirements for materials for secondary battery cases (containers, sheets and films), but they have problems in terms of dispersibility of a dispersed phase, and in toughness and the weld strength of moldings, as described above.

DISCLOSURE OF THE INVENTION

It is an object of the present invention to provide polyphenylene sulfide resin compositions excellent in toughness (impact strength) and weld strength when they are formed in moldings. It is also an object of the invention to provide polyphenylene sulfide resin compositions for secondary battery cases capable of maintaining initial electrolytic performance over a long period of time.

As a result of diligent studies on toughness (impact strength) and weld strength in the moldings obtained from resin compositions consisting of polyphenylene sulfide resins and amorphous thermoplastic resins, the present inventors have found that the toughness and weld strength of the obtained moldings are greatly improved by specifying the amount of oligomers and the amount of functional groups in polyphenylene sulfide resins; have found that these polyphenylene sulfide resin compositions can be utilized as the materials for secondary battery cases (injection moldings, sheet forming articles and film forming articles). Thus, the present inventors have attained the present invention.

Thus, the present invention relates to a polyphenylene sulfide resin composition, comprising:

(a) a polyphenylene sulfide resin having an amount of oligomers extractable with methylene chloride of 0.7% by weight or less and an amount of an —SX group (wherein S is a sulfur atom, and X is an alkali metal or hydrogen atom) of 20 µmol/g or more;

(b) an amorphous thermoplastic resin having a glass transition temperature (Tg) of 120° C. or higher; and (c) a copolymer at least comprising an unsaturated monomer having an epoxy group and/or an oxazolyl group and styrene as monomer components, the percentage of the above described styrene monomer in total monomers being more than 50% by weight, and the percentage of the above described unsaturated monomer in total monomers being from 0.3 to 20% by weight, Wherein the amount of component (b) is from 99 to 1 part by weight (wherein the sum of component (a) and component (b) totals 100 parts by weight); and the amount of component (c) is from 1 to 20 parts by weight relative to 100 parts by weight of the sum of component (a) and component (b).

Further, the above polyphenylene sulfide resin composition may comprise from 1 to 40 parts by weight, relative to 100 parts by weight of the sum of component (a) and component (b), of (d) a block copolymer composed of at least one polymer segment A mainly comprising a vinyl aromatic compound and at least one polymer segment B mainly comprising a conjugated diene compound and/or a hydrogenated block copolymer prepared by the hydrogenation of the above described block copolymer; and may also comprise from 1 to 300 parts by weight of (e) an inorganic filler, relative to 100 parts by weight of the sum of component (a) to component (c), or relative to 100 parts by weight of the sum of component (a) to component (d).

Furthermore, the present invention relates to secondary battery cases (injection moldings, sheet forming articles and film forming articles) obtained from the polyphenylene sulfide resin composition.

BEST MODE FOR CARRYING OUT THE INVENTION

The polyphenylene sulfide resin (hereinafter may be abbreviated as "PPS") to be used as component (a) in the resin composition of the present invention first needs to have an amount of oligomers extracted with methylene chloride of 0.7% by weight or less, preferably 0.6% by weight or less, most preferably 0.5% by weight or less. Note that the amount of extracted oligomers within the above range means that the amount of oligomers (about 10 to 30-mers) in PPS is small.

The amount of extracted oligomers exceeding the above upper limit is not preferred since the obtained resin compositions are poor in compatibility of polyphenylene sulfide with polyphenylene ether, and an improvement in weld strength cannot be expected and reduction in toughness (impact resistance) is large for the moldings obtained from the resin compositions.

The amount of oligomers extracted with methylene chloride can be measured by the following method: 5 g of PPS powder is added to 80 ml of methylene chloride, subjected to a Soxhlet extraction for 6 hours and then cooled to room temperature, and the methylene chloride solution after the extraction is transferred to a weighing bottle. Further, a total of 60 ml of methylene chloride is used, three times, to wash the above container used for the extraction, and the washings are collected in the above weighing bottle. Then, the methylene chloride in the weighing bottle is removed by evaporation by heating to about 80° C., and the residue is weighed. The percentage of the amount of the oligomers present in the PPS is determined from the amount of the residue.

The PPS, which is component (a), also needs to include an —SX group (wherein S is a sulfur atom, and X is an alkali metal or a hydrogen atom) in an amount of 20 µmol/g or more, preferably from 20 to 60 µmol/g. The amount of the —SX group less than the above lower limit is not preferred since the obtained resin compositions are poor in compatibility of polyphenylene sulfide with polyphenylene ether, and an improvement in weld strength cannot be expected and reduction in toughness (impact resistance) is large for the moldings obtained from the resin compositions.

The —SX group can be quantified according to the following method: PPS powder is preliminarily dried at 120° C. for 4 hours. Then, 20 g of the dried PPS powder is added to 150 g of N-methyl-2-pyrrolidone and vigorously stirred for mixing at room temperature for 30 minutes so that powder agglomerates are eliminated, thereby forming a slurry. The slurry is filtered, and then washed repeatedly 7 times each with one liter of hot water of about 80° C. The resultant filter cake is added into 200 g of pure water for slurrying it again, and then the slurry is added with 1 N HCl to adjust its pH to 4.5. Next, the slurry is stirred at 25° C. for 30 minutes, filtered, and then washed repeatedly 6 times each with one liter of hot water of about 80° C. The resultant filter cake is added into 200 g of pure water for slurrying it again, and then the slurry is titrated with 1 N sodium hydroxide to determine the amount of the —SX group present in the PPS from the consumed amount of sodium hydroxide.

The methods for producing PPS typically include: (1) a method for polymerizing halogen-substituted aromatic compounds (for example, p-dichlorobenzene) in the presence of sulfur and sodium carbonate; (2) a method for polymerizing halogen-substituted aromatic compounds (for example, p-dichlorobenzene) in polar solvents in the presence of sodium sulfide, sodium bisulfide and sodium hydroxide, hydrogen sulfide and sodium hydroxide, or sodium aminoalkanoate; (3) self-condensation of p-chlorothiophenol; and the like. Among them, a method for reacting sodium sulfide with p-dichlorobenzene in amide-based solvents such as N-methylpyrrolidone or dimethylacetamide, or in sulfone-based solvents such as sulfolane is suitable.

Incidentally, these production methods may be performed according to, but not limited to, publicly known methods. PPS can be obtained by the methods described in, for example, U.S. Pat. No. 2,513,188, JP-B-44-27671, JP-B-45-3368, JP-B-52-12240, JP-A-61-225217, U.S. Pat. No. 3,274,165, British Patent No. 1160660, JP-B-46-27255, Belgium Patent No. 29437, and JP-A-05-222196, and the methods of the prior art illustrated in these specifications. Specific examples of the methods for producing the PPS wherein the amount of oligomers extracted with methylene chloride is 0.7% by weight or less and an —SX group is included in an amount of 20 μmol/g or more include the production methods described in Examples 1 and 2 of JP-A-08-253587 (paragraph number 0041–0044) and the production methods described in Synthesis Examples 1 and 2 of JP-A-11-106656 (paragraph number 0046-0048).

Preferably, PPS used in the present invention has a melt viscosity at 300° C. (the value obtained after maintaining it at 300° C. under a load of 20 kgf/cm$^2$ at L/D=10/1 for 6 minutes, using a flow tester) of 1 to 10,000 poise. Further, the structure of PPS may be linear or branched, provided the above described specific amount of extracted oligomers and —SX group content are satisfied, but a linear structure is more preferable.

Next, amorphous thermoplastic resins having a glass transition temperature (Tg) of 120° C. or higher which are used as component (b) in the present invention may include polycarbonates, polysulfones, polyarylates, polyphenylene ethers, polyetherimides, polyethersulfones, and the like. Among them, polyphenylene ethers are preferably used as the materials for secondary battery cases. Note that these thermoplastic resins may be used singly or in combination of two or more in the present invention.

The component (b), particularly a polyphenylene ether resin (hereinafter may be abbreviated as "PPE"), is an essential component for imparting heat resistance (deflection temperature under load: DTUL), thermal creep resistance and flame resistance to the moldings obtained from the resin compositions of the present invention. Here, PPE comprises a bonding unit represented by general formula (1):

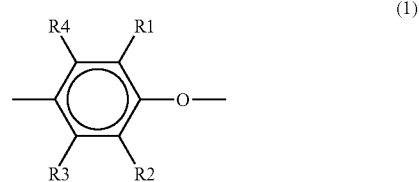

wherein R1, R2, R3 and R4 are, each independently, selected from the group consisting of hydrogen, halogen, a primary or secondary lower alkyl group having 1–7 carbon atoms, a phenyl group, a haloalkyl group, an aminoalkyl group, a hydrocarbonoxy group, and a halohydrocarbonoxy group in which at least two carbon atoms separate a halogen atom and an oxygen atom. Moreover, the reduced viscosity of PPE (0.5 g/dl, chloroform solution, measured at 30° C.) is preferably in a range of 0.15 to 2.0, more preferably in a range of 0.20 to 1.0. Further, PPE may be a homopolymer or a copolymer.

Specific examples of PPE may include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), and the like. In addition, specific examples of PPE may also include polyphenylene ether copolymers such as copolymers of 2,6-dimethyl phenol and other phenols (for example, 2,3,6-trimethylphenol or 2-methyl-6-butylphenol). Among them, poly(2,6-dimethyl-1,4-phenylene ether) and a copolymer of 2,6-dimethyl phenol and 2,3,6-trimethylphenol are preferred, and poly(2,6-dimethyl-1,4-phenylene ether) is most preferred.

The methods for producing PPE are not particularly limited, but PPE can be easily produced by oxidatively polymerizing 2,6-xylenol, for example, using a complex catalyst of a cuprous salt and an amine as described in U.S. Pat. No. 3,306,874. In addition, PPE can also be easily produced by the methods described in U.S. Pat. No. 3,306,875, U.S. Pat. No. 3,257,357, U.S. Pat. No. 3,257,358, JP-B-52-17880, JP-A-50-51197, JP-A-63-152628, or the like.

Further, the additive used as component (c) in the present invention acts as both an emulsifier and a dispersant for mixing component (a) and component (b). The component (c) effectively reacts particularly with component (a) that has a specific amount of extracted oligomers and an —SX group content as defined in the present invention, so that it becomes possible to provide the moldings obtained from polyphenylene sulfide resin compositions with good toughness and weld strength.

In the present invention, a copolymer at least comprising as monomer components an unsaturated monomer having an epoxy group and/or oxazolyl group and styrene is used as component (c). Here, the percentage of the above described unsaturated monomer in total monomers is from 0.3 to 20% by weight, preferably from 1 to 15% by weight, more preferably from 3 to 10% by weight. In addition, styrene needs to be a main monomer component, and the percentage of styrene in total monomers is more than 50% by weight, preferably 65% by weight or more. Incidentally, the upper limit of the amount of styrene is not limited, and the percentage of styrene in total monomers may be 99.7% by weight or less.

Here, it is believed that the epoxy group or oxazolyl group contained in the copolymer of component (c) effectively chemically reacts with the —SX group contained in the PPS of component (a) to form a graft polymer of the additive (component (c)) and the —SX group-containing PPS (component (a)). And the formation of such a graft polymer improves the mixing and dispersion between the PPS, which is component (a), and the amorphous thermoplastic resin, which is component (b), and makes it possible to improve toughness and weld strength in the moldings obtained from the polyphenylene sulfide resin composition.

Therefore, it is not preferable that the percentage of the unsaturated monomer having an epoxy group or an oxazolyl group in component (c) is less than 0.3% by weight with respect to the total amount of monomers, because the graft reaction with component (a) only proceeds with difficulty, and thus the resin composition of the present invention cannot be provided with a suitable mixing and dispersion form and the improvement of toughness and weld strength of the obtained moldings cannot be expected. Moreover, it is not preferable that the percentage of the unsaturated monomer having an epoxy group or an oxazolyl group is more than 20% by weight with respect to the total amount of monomers, because the graft reaction with component (a) only proceeds with difficulty, and crosslinking reactions such as gelation and other reactions occur due to the existence of excess functional groups. Hence the resin composition of the present invention cannot be provided with a suitable mixing and dispersion form and the improvement of toughness and weld strength of the obtained moldings cannot be expected.

The unsaturated monomers having an epoxy group include glycidyl methacrylate, glycidyl acrylate, vinyl glycidyl ether, glycidyl ether of hydroxyalkyl (meth)acrylate, glycidyl ether of polyalkylene glycol (meth)acrylate, glycidyl itaconate, and the like. Among them, glycidyl methacrylate is preferable.

The unsaturated monomers having an oxazolyl group include vinyl oxazoline compounds represented by general formula (2):

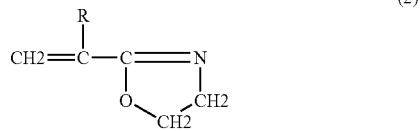

(2)

wherein R is a hydrogen atom, or an alkyl group or an alkoxy group having 1–6 carbon atoms. Among them, the compounds in which R is a hydrogen atom or a methyl group are preferable. Among them, 2-isopropenyl-2-oxazoline is industrially available and is preferably used.

Moreover, monomers copolymerizable with styrene may be included in the copolymer of component (c) as an additional monomer component other than the above unsaturated monomers and styrene. For example, they include vinyl aromatic compounds (but styrene is excluded), vinyl cyanide monomers such as acrylonitrile, vinyl acetate, (meth)acrylates, and the like.

The above component (c) may include, for example, copolymers of unsaturated monomers having an epoxy group and/or an oxazolyl group and a styrene monomer and copolymers of unsaturated monomers having an epoxy group and/or an oxazolyl group, styrene and acrylonitrile (the percentage of acrylonitrile in total monomers=10-25% by weight). Specifically, they include styrene-glycidyl methacrylate copolymers, styrene-glycidyl methacrylate-methyl methacrylate copolymers, styrene-glycidyl methacrylate-acrylonitrile copolymers, styrene-vinyl oxazoline copolymers, styrene-vinyl oxazoline-acrylonitrile copolymers, and the like.

Next, component (d) in the polyphenylene sulfide composition of the present invention will be described. The component (d) used in the present invention is a block copolymer composed of at least one polymer segment A mainly comprising a vinyl aromatic compound and at least one polymer segment B mainly comprising a conjugated diene compound, and/or a hydrogenated block copolymer prepared by hydrogenation of the above described block copolymer. The component (d) can further improve the toughness of the moldings obtained from the polyphenylene sulfide resin composition comprising the above (a) to (c) components, because the component (d) can be dispersed in the amorphous thermoplastic resin of component (b) and the polyphenylene sulfide resin of component (a).

The structure of the block copolymer consisting of the above polymer segment A and polymer segment B is not particularly limited, but may be any of linear, branched, radial or any combination thereof. For example, the structure includes A-B, A-B-A, B-A-B-A, (A-B-)$_4$-Si, A-B-A-B-A, and the like. Moreover, the component (d) preferably includes from 5 to 95% by weight, more preferably from 10 to 80% by weight of vinyl aromatic compounds, relative to the total block copolymer.

Here, the polymer segment A mainly comprising a vinyl aromatic compound refers to a homopolymer of a vinyl aromatic compound or a copolymer of a vinyl aromatic compound and a conjugated diene compound containing a vinyl aromatic compound preferably in an amount of more than 50% by weight, more preferably in an amount of 70% by weight or more. On the other hand, the polymer segment B mainly comprising a conjugated diene compound refers to a homopolymer of a conjugated diene compound or a copolymer of a conjugated diene compound and a vinyl aromatic compound containing a conjugated diene compound preferably in an amount of more than 50% by weight, more preferably in an amount of 70% by weight or more.

Moreover, in the polymer segment A and polymer segment B, the distribution of the conjugated diene compound or vinyl aromatic compound in the molecular chain of each polymer segment may be random, tapered (the monomer component increasing or decreasing along the molecular chain), partially blocked or any combination thereof. When the polymer segment A and polymer segment B are each present in a number of two or more, like a B-A-B-A structure, each polymer segment may have the same structure (molecular weight and monomer distribution) or a different structure.

As the examples of the vinyl aromatic compound, one or more can be selected from styrene, α-methyl styrene, vinyl toluene, p-tert-butyl styrene, diphenyl ethylene and the like. Among them, styrene is preferred. Moreover, as the examples of the conjugated diene compound, one or more can be selected from butadiene, isoprene, 1,3-pentadiene, 2,3-dimethyl-1,3-butadiene and the like. Among them, butadiene, isoprene and combinations thereof are preferred.

Furthermore, any bonding form (micro structure) of the conjugated diene compound can be selected for the polymer segment B mainly comprising the conjugated diene compound. For example, in the polymer segment mainly comprising butadiene, a 1,2-vinyl bond is preferably included in an amount of from 2 to 90%, more preferably from 8 to 80%. In the polymer segment mainly comprising isoprene, the sum of a 1,2-vinyl bond and 3,4-vinyl bond is preferably in an amount of from 2 to 80%, more preferably from 3 to 70%.

The number average molecular weight (number average molecular weight (Mn) in terms of polystyrene measured by gel permeation chromatography) of the block copolymer of component (d) is preferably from 5,000 to 1,000,000, more preferably from 20,000 to 500,000, most preferably from 20,000 to 300,000. Moreover, the molecular weight distribution (the ratio of the weight average molecular weight (Mw) and the number average molecular weight (Mn) in terms of polystyrene measured by gel permeation chromatography) is preferably 10 or less.

Next, the hydrogenated block copolymer used as component (d) of the present invention can be obtained by the hydrogenation of the above block copolymers. For example, of the above block copolymers, aliphatic double bonds in the polymer segment B mainly comprising the conjugated diene compound are subjected to hydrogenation to form the hydrogenated block copolymer. Incidentally, the percentage of hydrogenation of the aliphatic double bonds is preferably at least more than 20%, more preferably 50% or more, most preferably 80% or more. The percentage of hydrogenation of block copolymers can be determined, for example, by nuclear magnetic resonance apparatus (NMR) or the like.

The hydrogenated block copolymer having a structure of polystyrene-hydrogenated polybutadiene-polystyrene with a number average molecular weight of 20,000 to 300,000 and an amount of bonded styrene of 10 to 80% by weight is most preferably used as component (d) in the present invention.

Lastly, inorganic fillers of component (e) in the polyphenylene resin composition of the present invention are the components that provide the composition consisting of components (a) to (c) or components (a) to (d) with a number of functions, which may be appropriately selected depending on the purpose, for example, providing rigidity, providing heat resistance, providing thermal conductivity, providing electric conductivity, improving mold shrinkage factor, improving coefficient of linear expansion and the like. Inorganic fillers that may be used as component (e) include, for example, inorganic salts, glass fibers (glass filaments and chopped strand glass fibers), glass flakes, glass beads, carbon fibers, whiskers, mica, talc, carbon black, titanium oxide, calcium carbonate, potassium titanate, wollastonite, thermally conductive substances (graphite, aluminum nitride, boron nitride, alumina, beryllium oxide, silicon dioxide, magnesium oxide, aluminum nitrate, barium sulfate and the like), electrically conductive metal fibers, electrically conductive metal flakes, electrically conductive carbon black, electrically conductive carbon fibers and the like. These inorganic fillers may be treated with known surface treatment agents for improving the dispersibility in the above polyphenylene sulfide resins and polyphenylene ether resins, and may be treated with known sizing agents for improving handling properties during processing.

The amount of each component in the polyphenylene sulfide resin composition of the present invention will now be described. First, the polyphenylene sulfide resin composition of the present invention includes component (a) and component (b), which are essential components, in an amount of 1 to 99 parts by weight and an amount of 99 to 1 part by weight, respectively (the sum of component (a) and component (b) being 100 parts by weight), and includes component (c), which is also an essential component, in an amount of 1 to 20 parts by weight relative to 100 parts by weight of the sum of component (a) and component (b).

In addition, when the polyphenylene sulfide resin composition of the present invention includes component (d), the amount of component (d) is 1 to 40 parts by weight, preferably 1 to 35 parts by weight relative to 100 parts by weight of the sum of component (a) and component (b).

Further, when the polyphenylene sulfide resin composition of the present invention includes component (e), the amount of component (e) is 1 to 300 parts by weight, preferably 1 to 200 parts by weight, more preferably 1 to 150 parts by weight, relative to 100 parts by weight of the sum of component (a) to component (c) (when the polyphenylene sulfide resin composition of the present invention consists of components (a), (b) and (c)), and is 1 to 300 parts by weight, preferably 1 to 200 parts by weight, more preferably 1 to 150 parts by weight, relative to 100 parts by weight of the sum of component (a) to component (d) (when the polyphenylene sulfide resin composition of the present invention consists of components (a), (b), (c) and (d)).

In the present invention, it is most preferable that the polyphenylene sulfide resin composition includes 30 to 90 parts by weight of component (a), 10 to 70 parts by weight of component (b) (the sum of component (a) and component (b) being 100 parts by weight), 1 to 10 parts by weight of component (c), and 3 to 25 parts by weight of component (d).

Incidentally, the morphology of the polyphenylene sulfide resin composition, that is, the state of dispersion of each component, can generally be easily determined by a transmission electron microscope. Specifically, a heavy metal compound such as ruthenium tetrachloride is first used to oxidatively dye the sample of the resin composition, which is then cut into an ultrathin section with an ultramicrotome or the like. The section is observed by a transmission electron microscope to determine the state of dispersion of each component. In addition, the morphology of the resin composition can be determined by the electron micrograph thereof (for example, 10,000×)

The morphology of the above described phenylene sulfide resin composition consisting of component (a), component (b), component (c) and component (d) exhibits a multi-phase structure, in which, specifically, component (a) forms a matrix phase; component (b) forms a dispersed phase; and component (d) coexists in component (b), the dispersed phase.

The method for producing the polyphenylene sulfide resin composition of the present invention will now be described below. In order to industrially easily obtain the polyphenylene sulfide resin composition of the present invention, a multi-screw extruder having twin screws or which is capable of assembling kneading blocks in any position is used as a melt kneader for melting and kneading each component of (a) to (e). All kneading block parts of the screws are assembled so as to satisfy substantially $(L/D) \geqq 1.5$, more preferably $(L/D) \geqq 5$ (wherein L denotes the total length of the kneading blocks; and D denotes the maximum outer diameter of the kneading blocks). In addition, it is preferable to satisfy $(\pi \cdot D \cdot N/h) \geqq 50$ (wherein $\pi = 3.14$, D=the screw outer diameter corresponding to the metering zone, N=the number of screw revolutions (revolutions/second), and h=the depth of grooves for the metering zone). Moreover, in this case, it is preferable to use, as the multi-screw extruder, a twin-screw extruder in which there are provided a first raw material supply port upstream of the raw material flow direction, a second raw material supply port downstream thereof, one or more additional raw material supply ports downstream of the second raw material supply port as necessary, and a vacuum vent port between these raw material supply ports.

Of the methods for producing the polyphenylene sulfide resin composition of the present invention, a preferred method for supplying raw materials includes a method for supplying the total amount of components (a) to (d) all at once from the first raw material supply port.

Further, a method for supplying 50% by weight or less of component (a) and the total amount of component (b) from the first raw material supply port and the remainder of component (a) from the second supply port may also be employed. In this case, it is preferable to supply component (c) by mixing it with component (a) and component (b) to be supplied from the first raw material supply port. In addition, it is also preferable to supply component (d) by mixing it with component (a) to component (c) to be supplied from the first raw material supply port. However, the supply of component (c) and component (d) is not limited to the above.

Incidentally, component (e) is preferably supplied in the condition where component (a) to component (d) are completely molten and kneaded, and typically supplied from the second raw material supply port or thereafter.

Here, barrel temperatures are set at generally from 280 to 350° C., preferably from 280 to 310° C., in the zone for melting and kneading, and the number of screw revolutions is set at generally from 100 to 1,200 rpm, preferably from 100 to 500 rpm.

In the present invention, other additional components may be added other than the above described components as necessary within a range where the characteristics and effects of the present invention are not impaired. For example, for the purpose of further improving impact resistance, a copolymer prepared by copolymerizing an unsaturated monomer having an epoxy group and/or an oxazolyl group with α-olefin (preferably ethylene), in a percentage of 1 to 20% by weight of the former, may be added in an amount of 1 to 20 parts by weight to 100 parts by weight of the sum of component (a) to component (c) of the present invention.

Other typically used additives may be added, such as anti-oxidants, metal deactivators, flame retardants (such as organic phosphate compounds, condensed phosphate-based compounds, ammonium polyphosphate-based flame retardants, aromatic halogen-based flame retardants, and silicone-based flame retardants), fluorine-based polymers, plasticizers (such as low molecular weight polyethylenes, epoxidized soybean oil, polyethyleneglycol, and fatty acid esters), flame retardant aids such as antimony trioxide, weather (light) resistance improving agents, nucleating agents, slipping agents, various coloring agents, mold release agents and the like.

The thus obtained polyphenylene sulfide resin composition of the present invention can be preferably utilized as electronic/electric and automobile part moldings, because it can eliminate defects inherent in the conventional polyphenylene sulfide resin composition and improve the toughness (impact strength) and weld strength when it is formed into moldings.

In addition, the polyphenylene sulfide resin composition of the present invention can be processed into injection moldings, sheet forming articles and film forming articles as secondary battery case materials, because it has not only improved toughness (impact resistance) and weld strength, but also good physical properties inherent in polyphenylene sulfide itself such as thermal creep resistance, water vapor resistance and chemical resistance. As described herein, the secondary battery refers to lithium metal batteries, lithium ion batteries, polymer ion batteries, nickel-hydrogen batteries, lead storage batteries, alkaline storage batteries and the like.

The polyphenylene sulfide resin composition of the present invention can be molded into moldings depending on the applications and objects by conventionally known various processing methods, for example, various molding methods such as compression molding, injection molding, extrusion molding, multilayer extrusion molding and profile extrusion molding (including sheet forming and film forming).

EXAMPLES

The present invention will now be described in further detail by Examples, but the present invention is not limited to these Examples.

Component (a)

a-1: PPS having a melt viscosity (the value measured after maintaining at 300° C. under a load of 20 kgf/cm$^2$ at L/D=10/1 for 6 minutes, using a flow tester; hereinafter by the same procedure) of 500 poise, an amount of oligomers extractable with methylene chloride of 0.4% by weight and an amount of an —SX group of 29 μmol/g.

a-2: PPS having a melt viscosity of 500 poise, an amount of oligomers extractable with methylene chloride of 0.7% by weight and an amount of an —SX group of 30 μmol/g.

a-3: PPS having a melt viscosity of 500 poise, an amount of oligomers extractable with methylene chloride of 1.2% by weight and an amount of an —SX group of 31 μmol/g.

a-4: PPS having a melt viscosity of 500 poise, an amount of oligomers extractable with methylene chloride of 3.0% by weight and an amount of an —SX group of 29 μmol/g.

a-5: PPS having a melt viscosity of 500 poise, an amount of oligomers extractable with methylene chloride of 0.6% by weight and an amount of an —SX group of 7 μmol/g.

a-6: PPS having a melt viscosity of 200 poise, an amount of oligomers extractable with methylene chloride of 0.5% by weight and an amount of an —SX group of 36 μmol/g.

a-7: PPS having a melt viscosity of 250 poise, an amount of oligomers extractable with methylene chloride of 3.1% by weight and an amount of an —SX group of 40 mol/g (trade name "L3340", made by Toray Industries, Inc.).

a-8: PPS having a melt viscosity of 500 poise, an amount of oligomers extractable with methylene chloride of 1.8% by weight and an amount of an —SX group of 9 μmol/g.

Component (b)

b-1: Polyphenylene ether having a reduced viscosity of 0.54 and a glass transition temperature (Tg) of 209° C. obtained by oxidatively polymerizing 2,6-xylenol.

b-2: Polyphenylene ether having a reduced viscosity of 0.31 and a glass transition temperature (Tg) of 209° C. obtained by oxidatively polymerizing 2,6-xylenol.

b-3: Polycarbonate having a glass transition temperature (Tg) of 147° C.

b-4: Polyarylate having an intrinsic viscosity (measured at a weight ratio of phenol/tetrachloroethane=60/40, 1 g/dl and 25° C.) of 0.65 and a glass transition temperature (Tg) of 191° C. synthesized from a mixed phthalic acid of terephthalic acid/isophthalic acid=1/1 (molar ratio) and bisphenol A.

b-5: Polysulfone having a glass transition temperature (Tg) of 185° C. (udel-P1700 (registered trade name), made by Union Carbide Corporation)

b-6: Polyetherimide having a glass transition temperature (Tg) of 215° C. (ultem 1000 (registered trade name), made by General Electric Company).

Component (c)

C-1: Styrene-glycidyl methacrylate copolymer containing 5% by weight of glycidyl methacrylate (weight average molecular weight: 110,000).

C-2: Styrene-glycidyl methacrylate copolymer containing 18% by weight of glycidyl methacrylate (weight average molecular weight: 114,000).

C-3: Styrene-glycidyl methacrylate copolymer containing 22% by weight of glycidyl methacrylate (weight average molecular weight: 101,000).

C-4: Styrene-2-isopropenyl-2-oxazoline copolymer containing 5% by weight of 2-isopropenyl-2-oxazoline (weight average molecular weight: 146,000).

C-5: Styrene-acrylonitrile-2-isopropenyl-2-oxazoline copolymer containing 5% by weight of 2-isopropenyl-2-oxazoline, 25% by weight of acrylonitrile and 70% by weight of styrene (weight average molecular weight: 152,000).

Component (d)

d-1: Hydrogenated block copolymer having a structure of polystyrene-hydrogenated polybutadiene-polystyrene, an amount of bonded styrene of 35% by weight, a number average molecular weight of 178,000, and an amount of 1,2-vinyl bond in the polybutadiene part before hydrogenation of 48%.

d-2: Hydrogenated block copolymer having a structure of polystyrene-hydrogenated polybutadiene-polystyrene, an amount of bonded styrene of 60% by weight, a number average molecular weight of 113,000, and an amount of 1,2-vinyl bond in the polybutadiene part before hydrogenation of 44%.

Component (e)

e-1: Glass flake treated with aminosilane having an average particle size of 600 μm, an average thickness of 5 μm and an average aspect ratio of 5,120.

e-2: Glass fiber treated with aminosilane having a diameter of 13 μm and an average length of 3 mm.

e-3: Mica treated with aminosilane having an average flake diameter of 90 μm.

Other Additive Components (Component (f))

f-1: Ethylene-glycidyl methacrylate copolymer containing 6% by weight of glycidyl methacrylate (trade name "Bond First 2C", made by Sumitomo Chemical Co., Ltd.).

f-2: Ethylene-glycidyl methacrylate copolymer containing 12% by weight of glycidyl methacrylate (trade name "Bond First E", made by Sumitomo Chemical Co., Ltd.).

Examples 1 to 14 and Comparative Examples 1 to 15

Each of the components of (a) to (f) shown in Tables 1 to 3 was melted and kneaded using a twin-screw extruder (ZSK-40; made by WERNER&PFLEIDERER GmbH, Germany) set at a temperature of 290 to 310° C. and a number of screw revolutions of 500 rpm to obtain a polyphenylene sulfide resin composition as pellets. Incidentally, component (a) to component (d) were supplied from the first raw material supply port of the extruder, and component (e) and component (f) were supplied from the second raw material supply port.

The obtained pellets were supplied to a screw in-line type injection molding machine set at 290 to 310° C., and injection molded at a mold temperature of 130° C. into test pieces for a tensile test, for a weld tensile test, for an Izod impact test and for measuring the deflection temperature under load (DTUL).

Next, these test pieces were used to perform a tensile strength test (according to ASTM D-638: measuring temperature 23° C.) to measure the tensile strength and weld tensile strength. In addition, Izod (thickness ⅛, notched) impact strength (according to ASTM D-256: measuring temperature 23° C.) and deflection temperatures under load: DTUL (ASTM D-648: load 1.82 MPa) were also measured. The test results are shown in Tables 1 to 3.

Incidentally, the unit of the amount of each component formulated in Tables 1 to 3 is part by weight. Further, each amount of component (c) and component (d) is the amount relative to 100 parts by weight of the sum of component (a) and component (b), and each amount of component (e) and component (f) is the amount relative to 100 parts by weight of the sum of component (a) to component (c) (the same for Tables 4 to 5).

TABLE 1

|  | Example 1 | Example 2 | Example 3 | Example 4 | Example 5 | Example 6 | Example 7 |
| --- | --- | --- | --- | --- | --- | --- | --- |
| a-1 | 71 |  | 71 |  |  |  | 84 |
| a-2 |  | 71 |  | 71 | 59 | 78 |  |
| a-3 |  |  |  |  |  |  |  |
| a-4 |  |  |  |  |  |  |  |
| a-5 |  |  |  |  |  |  |  |
| a-6 |  |  |  |  |  |  |  |
| a-7 |  |  |  |  |  |  |  |
| a-8 |  |  |  |  |  |  |  |
| b-1 | 29 |  | 29 |  |  | 22 | 16 |
| b-2 |  | 29 |  | 29 | 41 |  |  |
| c-1 | 3.5 |  | 3.5 | 5.9 | 11.8 |  |  |
| c-2 |  | 2.4 |  |  |  |  |  |
| c-3 |  |  |  |  |  |  |  |
| c-4 |  |  |  |  |  | 8.9 |  |
| c-5 |  |  |  |  |  |  | 3.3 |
| d-1 | 17.6 | 17.6 | 11.7 | 17.6 | 17.6 | 11.1 | 5.6 |
| d-2 |  |  | 5.9 |  |  |  |  |
| e-1 |  |  |  |  |  |  |  |

TABLE 1-continued

|  | | | | | | | |
|---|---|---|---|---|---|---|---|
| e-2 | | | | | | | |
| e-3 | | | | | | | |
| f-1 | | | | 5.9 | | | |
| f-2 | | | | | | | 5.6 |
| DTUL (° C.) | 135 | 136 | 124 | 120 | 140 | 126 | 120 |
| Tensile strength (MPa) | 53 | 54 | 53 | 52 | 50 | 58 | 60 |
| Izod impact strength (J/m) | 137 | 128 | 90 | 151 | 102 | 62 | 88 |
| Weld tensile strength (MPa) | 52 | 53 | 53 | 51 | 49 | 58 | 60 |
| Weld tensile strength retention (%) | 98 | 98 | 100 | 98 | 98 | 100 | 100 |

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| a-1 | | | | | 71 | | |
| a-2 | | | | | | | |
| a-3 | | | 71 | | | | |
| a-4 | | 71 | | | | 71 | |
| a-5 | | | | 71 | | | |
| a-6 | | | | | | | |
| a-7 | 71 | | | | | | |
| a-8 | | | | | | | 71 |
| b-1 | 29 | 29 | 29 | 29 | | | 29 |
| b-2 | | | | | 29 | 29 | |
| c-1 | 3.5 | 3.5 | 3.5 | 3.5 | | | 3.5 |
| c-2 | | | | | | | |
| c-3 | | | | | 3.5 | 3.5 | |
| c-4 | | | | | | | |
| c-5 | | | | | | | |
| d-1 | 17.6 | 17.6 | 17.6 | 17.6 | 17.6 | 17.6 | 17.6 |
| d-2 | | | | | | | |
| e-1 | | | | | | | |
| e-2 | | | | | | | |
| e-3 | | | | | | | |
| f-1 | | | | | | | |
| f-2 | | | | | | | |
| DTUL (° C.) | 134 | 133 | 134 | 135 | 132 | 131 | 134 |
| Tensile strength (MPa) | 43 | 47 | 46 | 42 | 41 | 43 | 42 |
| Izod impact strength (J/m) | 10 | 14 | 15 | 8 | 9 | 10 | 11 |
| Weld tensile strength (MPa) | 29 | 28 | 34 | 25 | 22 | 26 | 23 |
| Weld tensile strength retention (%) | 67 | 60 | 74 | 59 | 54 | 60 | 55 |

TABLE 2

|  | Example 8 | Example 9 | Example 10 | Example 11 | Example 12 | Example 13 | Example 14 |
|---|---|---|---|---|---|---|---|
| a-1 | 60 | 71 | | | | 60 | 60 |
| a-2 | | | | 60 | | | |
| a-3 | | | | | | | |
| a-4 | | | | | | | |
| a-5 | | | | | | | |
| a-6 | | | 60 | | 60 | | |
| a-7 | | | | | | | |
| a-8 | | | | | | | |
| b-1 | 40 | 29 | | | 40 | | 40 |
| b-2 | | | 40 | 40 | | 40 | |
| c-1 | 3 | 3.5 | 5 | 3 | 3 | 5 | 6 |
| c-2 | | | | | | | |
| c-3 | | | | | | | |
| c-4 | | | | | | | |
| c-5 | | | | | | | |
| d-1 | | 17.6 | | | | | |
| d-2 | | | | | | | |
| e-1 | 20 | 20 | 20 | 40 | | | 20 |
| e-2 | 20 | 20 | 20 | | 20 | 40 | 20 |
| e-3 | | | | | 20 | | |
| f-1 | | | | | | | 10 |
| f-2 | | | | | | | |
| DTUL (° C.) | 200 | 191 | 206 | 179 | 197 | 215 | 172 |
| Tensile strength (MPa) | 98 | 92 | 98 | 59 | 74 | 118 | 95 |

TABLE 2-continued

|  |  |  |  |  |  |  |  |
|---|---|---|---|---|---|---|---|
| Izod impact strength (J/m) | 40 | 71 | 40 | 17 | 23 | 52 | 96 |
| Weld tensile strength (MPa) | 65 | 63 | 67 | 39 | 37 | 51 | 60 |
| Weld tensile strength retention (%) | 66 | 69 | 68 | 66 | 50 | 43 | 63 |

|  | Comparative Example 8 | Comparative Example 9 | Comparative Example 10 | Comparative Example 11 | Comparative Example 12 | Comparative Example 13 |
|---|---|---|---|---|---|---|
| a-1 | 60 |  |  |  |  |  |
| a-2 |  |  |  |  |  |  |
| a-3 |  |  |  | 60 |  |  |
| a-4 |  |  |  |  | 60 |  |
| a-5 |  |  |  |  |  | 60 |
| a-6 |  |  |  |  |  |  |
| a-7 |  | 60 |  |  |  |  |
| a-8 |  |  | 60 |  |  |  |
| b-1 | 40 | 40 | 40 | 40 | 40 | 40 |
| b-2 |  |  |  |  |  |  |
| c-1 |  | 3 | 3 | 3 | 3 | 3 |
| c-2 |  |  |  |  |  |  |
| c-3 |  |  |  |  |  |  |
| c-4 |  |  |  |  |  |  |
| c-5 |  |  |  |  |  |  |
| d-1 |  |  |  |  |  |  |
| d-2 |  |  |  |  |  |  |
| e-1 | 20 | 20 | 20 | 20 | 20 | 20 |
| e-2 | 20 | 20 | 20 | 20 | 20 | 20 |
| e-3 |  |  |  |  |  |  |
| f-1 |  |  |  |  |  |  |
| f-2 |  |  |  |  |  |  |
| DTUL (° C.) | 203 | 197 | 199 | 200 | 198 | 197 |
| Tensile strength (MPa) | 90 | 86 | 81 | 94 | 90 | 84 |
| Izod impact strength (J/m) | 20 | 12 | 10 | 18 | 19 | 13 |
| Weld tensile strength (MPa) | 32 | 24 | 24 | 29 | 26 | 23 |
| Weld tensile strength retention (%) | 36 | 28 | 30 | 31 | 29 | 27 |

TABLE 3

|  | Comparative Example 14 | Comparative Example 15 |
|---|---|---|
| a-1 |  |  |
| a-2 |  |  |
| a-3 |  |  |
| a-4 |  |  |
| a-5 |  |  |
| a-6 |  |  |
| a-7 | 60 |  |
| a-8 |  | 60 |
| b-1 |  | 40 |
| b-2 | 40 |  |
| c-1 | 3 | 3 |
| c-2 |  |  |
| c-3 |  |  |
| c-4 |  |  |
| c-5 |  |  |
| d-1 |  |  |
| d-2 |  |  |
| e-1 | 40 |  |
| e-2 |  | 20 |
| e-3 |  | 20 |
| f-1 |  |  |
| f-2 |  |  |
| DTUL (° C.) | 178 | 195 |
| Tensile strength (MPa) | 42 | 41 |
| Izod impact strength (J/m) | 8 | 10 |
| Weld tensile strength (MPa) | 25 | 22 |
| Weld tensile strength retention (%) | 60 | 54 |

Further, the morphology in the central part of the tensile test pieces obtained from the polyphenylene sulfide resin compositions of Examples 1 to 7 was observed in the transmission electron micrograph. From this observation, it was confirmed that polyphenylene ether resin, component (b), was dispersed as particles of about 1 μm in polyphenylene sulfide of component (a) which is the matrix phase, and a hydrogenated block copolymer, component (d), was dispersed in the dispersed phase of the polyphenylene ether.

These results revealed that when using a polyphenylene sulfide resin having an amount of oligomers extracted with methylene chloride, which is the index of the amount of the oligomers in the polyphenylene resin, of more than 0.7% by weight, the toughness (impact strength) and weld tensile strength were remarkably reduced. In addition, it was also revealed that even if the amount of oligomers extracted with methylene chloride was 0.7% by weight or less, the toughness (impact strength) and weld tensile strength of the injection moldings were remarkably reduced, when using a polyphenylene resin having an amount of an —SX group (S is a sulfur atom, and X is an alkali metal or a hydrogen atom) present in the polyphenylene sulfide resin of less than 20 µmol/g.

Further, it was revealed that when using a copolymer having an amount of an unsaturated monomer with an epoxy group and/or oxazolyl group of more than 20% by weight as component (c), the toughness (impact strength) and weld tensile strength were remarkably reduced.

Example 15

The polyphenylene sulfide resin composition obtained in Example 1 was used to measure the thermal creep performance required for sealed secondary battery cases by a creep tester (made by Yasuda Seiki Seisakusho Ltd., 145-B-PC type). As conditions for the creep test, a dumbbell specimen (width 4 mm×thickness 1 mm×length 70 mm) obtained from the polyphenylene sulfide resin composition was used at a temperature of 95° C. with a load corresponding to a stress of 12.25 MPa between a chuck length of 40 mm to measure the time when the strain reaches 20 mm. As a result, the strain was only 6 mm even after 5,000 hours, which revealed that the material exhibited adequate performance as a material for sealed secondary battery cases.

Examples 16 to 19

As shown in Table 4, pellets of resin compositions were obtained according to the same procedure as in Example 1, except that (b-3), (b-4), (b-5) and (b-6) were used as component (b), respectively. The pellets were supplied to a screw in-line type injection molding machine set at 290° C. to 310° C., and injection molded at a mold temperature of 130° C. into test pieces for a tensile test, for a weld tensile test, for an Izod impact test and for measuring the deflection temperature under load (DTUL).

Next, these test pieces were used to perform a tensile strength test (according to ASTM D-638: measuring temperature 23° C.) to measure the tensile strength and weld tensile strength. In addition, Izod (thickness ⅛, notched) impact strength (according to ASTM D-256: measuring temperature 23° C.) and deflection temperature under load: DTUL (ASTM D-648: load 1.82 MPa) were also measured. These results are shown in Table 4. The injection moldings obtained from Examples 16 to 19 were excellent in heat resistance and weld strength.

TABLE 4

|  | Example 16 | Example 17 | Example 18 | Example 19 |
|---|---|---|---|---|
| a-1 | 71 | 71 | 71 | 71 |
| a-2 |  |  |  |  |
| a-3 |  |  |  |  |
| a-4 |  |  |  |  |
| a-5 |  |  |  |  |
| a-6 |  |  |  |  |
| a-7 |  |  |  |  |
| a-8 |  |  |  |  |
| b-3 | 29 |  |  |  |
| b-4 |  | 29 |  |  |
| b-5 |  |  | 29 |  |
| b-6 |  |  |  | 29 |
| c-1 | 3.5 | 3.5 | 3.5 | 3.5 |
| c-2 |  |  |  |  |
| c-3 |  |  |  |  |
| c-4 |  |  |  |  |
| c-5 |  |  |  |  |
| d-1 | 17.6 | 17.6 | 17.6 | 17.6 |
| d-2 |  |  |  |  |
| e-1 |  |  |  |  |
| e-2 |  |  |  |  |
| e-3 |  |  |  |  |
| f-1 |  |  |  |  |
| f-2 |  |  |  |  |
| DTUL (° C.) | 115 | 128 | 127 | 137 |
| Tensile strength (MPa) | 49 | 44 | 47 | 46 |
| Izod impact strength (J/m) | 56 | 49 | 67 | 79 |
| Weld tensile strength (MPa) | 39 | 37 | 38 | 41 |
| Weld tensile strength retention (%) | 80 | 84 | 81 | 89 |

Example 20 and Comparative Example 16

Pellets of resin compositions were obtained according to the same procedure as in Example 1 except that the formulations shown in Table 5 were used.

The pellets were supplied to a screw in-line type injection molding machine set at 290° C. to 310° C., and injection molded at a mold temperature of 130° C. into test pieces for a tensile test, for a weld tensile test, for an Izod impact test and for measuring the deflection temperature under load (DTUL).

Next, these test pieces were used to perform a tensile strength test (according to ASTM D-638: measuring temperature 23° C.) to measure tensile strength and weld tensile strength. In addition, Izod (thickness ⅛, notched) impact strength (according to ASTM D-256: measuring temperature 23° C.) and deflection temperature under load: DTUL (ASTM D-648: load 1.82 MPa) were also measured.

These results are shown in Table 5. It was revealed that when component (c) was not formulated, the DTUL and tensile strength of the injection moldings were inferior, and especially the weld property was remarkably reduced.

TABLE 5

|  | Example 20 | Comparative Example 16 |
|---|---|---|
| a-1 | 70 | 70 |
| a-2 |  |  |
| a-3 |  |  |
| a-4 |  |  |
| a-5 |  |  |
| a-6 |  |  |
| a-7 |  |  |
| a-8 |  |  |
| b-1 | 30 | 30 |
| b-2 |  |  |
| c-1 | 3 |  |
| c-2 |  |  |
| c-3 |  |  |
| c-4 |  |  |
| c-5 |  |  |
| d-1 |  |  |
| d-2 |  |  |
| e-1 |  |  |
| e-2 |  |  |
| e-3 |  |  |
| f-1 |  |  |
| f-2 |  |  |
| DTUL (° C.) | 150 | 144 |
| Tensile strength (MPa) | 76 | 64 |

TABLE 5-continued

|  | Example 20 | Comparative Example 16 |
|---|---|---|
| Izod impact strength (J/m) | 18 | 4 |
| Weld tensile strength (MPa) | 75 | 37 |
| Weld tensile strength retention (%) | 99 | 58 |

INDUSTRIAL APPLICABILITY

As the polyphenylene sulfide resin composition of the present invention uses a polyphenylene sulfide resin having a specific amount of oligomers and a specific amount of a functional group and an additive having a specific amount of a functional group, the toughness (impact strength) and weld strength of the moldings made from this resin composition can be remarkably improved.

Further, the polyphenylene resin composition of the present invention is suitably used as battery cases for secondary batteries and as sheet or film materials for secondary batteries.

The invention claimed is:

1. A polyphenylene sulfide resin composition, comprising:
   (a) a polyphenylene sulfide resin having an amount of oligomers extractable with methylene chloride of 0.7% by weight or less and an amount of an —SX group of 20 μmol/g or more wherein S is a sulfur atom, and X is an alkali metal or a hydrogen atom;
   (b) an amorphous thermoplastic resin having a glass transition temperature (Tg) of 120° C. or higher; and
   (c) a copolymer at least comprising an unsaturated monomer having an epoxy group and/or an oxazolyl group and styrene as monomer components, the percentage of said styrene monomer in total monomers being more than 50% by weight, and the percentage of said unsaturated monomer in total monomers being from 0.3 to 20% by weight,
   wherein the amount of component (a) is from 1 to 99 parts by weight; the amount of component (b) is from 99 to 1 part by weight wherein the sum of component (a) and component (b) totals 100 parts by weight; and the amount of component (c) is from 1 to 20 parts by weight relative to 100 parts by weight of the sum of component (a) and component (b), and
   wherein the amount of oligomers extractable with methylene chloride is measured by adding 5 g of the polyphenylene sulfide to 80 ml of methylene chloride and being subjected to a Soxhlet extraction for 6 hours.

2. The polyphenylene sulfide resin composition according to claim 1, comprising from 1 to 40 parts by weight, relative to 100 parts by weight of the sum of component (a) and component (b), of (d) a block copolymer comprised of at least one polymer segment A mainly comprising a vinyl aromatic compound and at least one polymer segment B mainly comprising a conjugated diene compound, and/or a hydrogenated block copolymer prepared by hydrogenation of said block copolymer.

3. The polyphenylene sulfide resin composition according to claim 2, comprising 1 to 35 parts by weight of component (d), relative to 100 parts by weight of the sum of component (a) and component (b).

4. The polyphenylene sulfide resin composition according to claim 1, comprising from 1 to 300 parts by weight of (e) an inorganic filler, relative to 100 parts by weight of the sum of component (a) to component (c).

5. The polyphenylene sulfide resin composition according to claim 2, comprising from 1 to 300 parts by weight of (e) an inorganic filler, relative to 100 parts by weight of the sum of component (a) to component (d).

6. The polyphenylene sulfide resin composition according to any one of claims 1 to 5, wherein component (a) has a melt viscosity of 1 to 10,000 poise determined at a temperature of 300° C. under a load of 20 kgf/cm$^2$ at L/D=10/1 for 6 minutes, using a flow tester.

7. The polyphenylene sulfide resin composition according to any one of claims 1 to 5, wherein component (b) is at least one thermoplastic resin selected from the group consisting of polycarbonates, polysulfones, polyarylates, polyphenylene ethers, polyetherimides, and polyethersulfones.

8. The polyphenylene sulfide resin composition according to claim 2, wherein component (d) is a hydrogenated block copolymer comprised of polystyrene-hydrogenated block copolymer comprised of polystyrene-hydrogenated polybutadiene-polystyrene having a number average molecular weight of 20,000 to 300,000 and an amount of bonded styrene of 10 to 80% by weight.

9. The polyphenylene sulfide resin composition according to claim 4 or 5, wherein component (e) is at least one selected from the group consisting of inorganic salts, glass fibers, glass flakes, glass beads, carbon fibers, whiskers, mica, talc, carbon black, titanium oxide, calcium carbonate, potassium titanate, wollastonite, thermally conductive substances, electrically conductive metal fibers, electrically conductive metal flakes, electrically conductive carbon black and electrically conductive carbon fibers.

10. The polyphenylene sulfide resin composition according to claim 2 or 3, wherein the morphology of the polyphenylene sulfide resin composition exhibits a multi-phase structure; the component forming a matrix is component (a); the component forming a dispersed phase is component (b); and the component coexisting in the dispersed phase is component (d).

11. A secondary battery case obtained from a polyphenylene sulfide resin composition, comprising:
   (a) a polyphenylene sulfide resin having an amount of oligomers extractable with methylene chloride of 0.7% by weight or less and an amount of an —SX group of 20 μmol/g or more wherein S is a sulfur atom, and X is an alkali metal or a hydrogen atom;
   (b) an amorphous thermoplastic resin having a glass transition temperature (Tg) of 120° C. or higher; and
   (c) a copolymer at least comprising an unsaturated monomer having an epoxy group and/or an oxazolyl group and styrene as monomer components, the percentage of said styrene monomer in total monomers being more than 50% by weight, and the percentage of said unsaturated monomer in total monomers being from 0.3 to 20% by weight,
      wherein the amount of component (a) is from 1 to 99 parts by weight; the amount of component (b) is from 99 to 1 part by weight wherein the sum of component (a) and component (b) totals 100 parts by weight; and the amount of component (c) is from 1 to 20 parts by weight relative to 100 parts by weight of the sum of component (a) and component (b), and wherein the amount of oligomers extractable with methylene chloride is measured by adding 5 g of the polyphenylene sulfide to 80 ml of methylene chloride and being subjected to a Soxhlet extraction for 6 hours.

12. The secondary battery case according to claim 11, wherein the polyphenylene sulfide resin composition comprises from 1 to 40 parts by weight, relative to 100 parts by weight of the sum of component (a) and component (b), of (d) a block copolymer comprised of at least one polymer segment A mainly comprising a vinyl aromatic compound and at least one polymer segment B mainly comprising a conjugated diene compound, and/or a hydrogenated block copolymer prepared by hydrogenation of said block copolymer.

13. The secondary battery case according to claim 11, wherein the polyphenylene sulfide resin composition comprises from 1 to 300 parts by weight of (e) an inorganic filler, relative to 100 parts by weight of the sum of component (a) to component (c).

14. The secondary battery case according to claim 12, wherein the polyphenylene sulfide resin composition comprises from 1 to 300 parts by weight of (e) an inorganic filler, relative to 100 parts by weight of the sum of component (a) to component (d).

15. The secondary battery case according to claim 11, wherein component (b) is polyphenylene ether.

* * * * *